Figure 13:
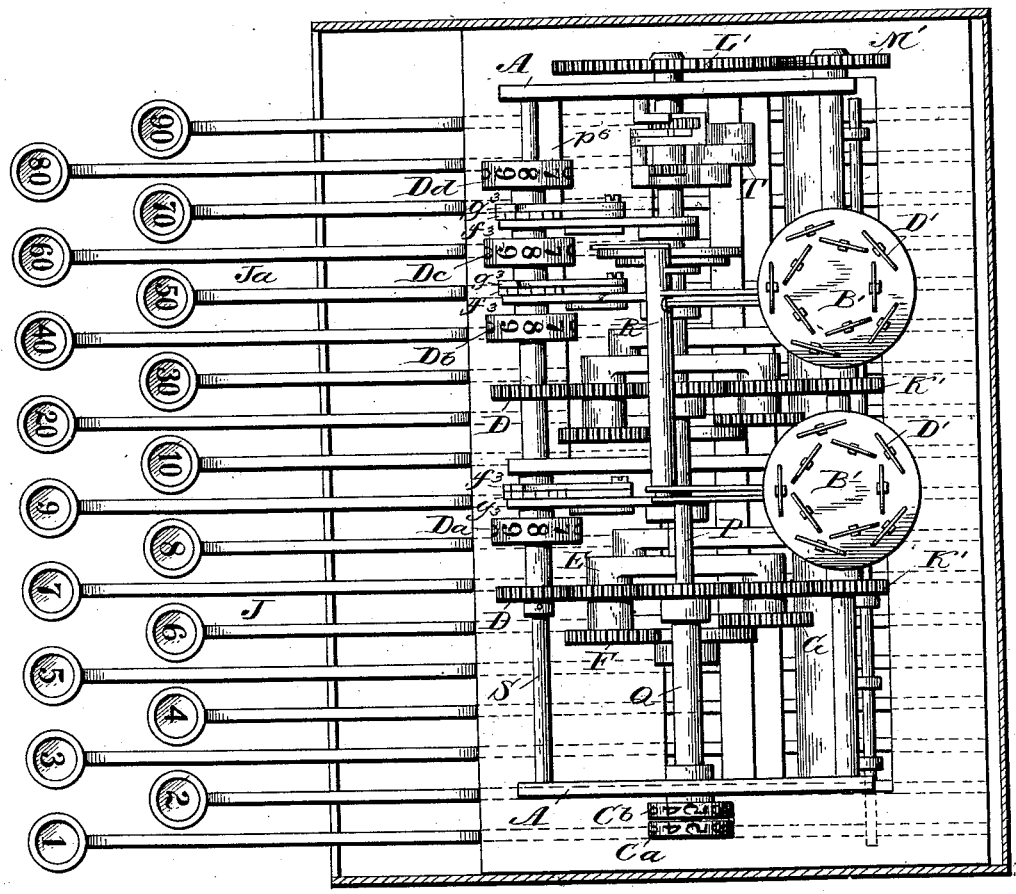

(No Model.) 6 Sheets—Sheet 1.
H. COOK.
CASH REGISTER, INDICATOR, AND RECORDER.
No. 518,344. Patented Apr. 17, 1894.
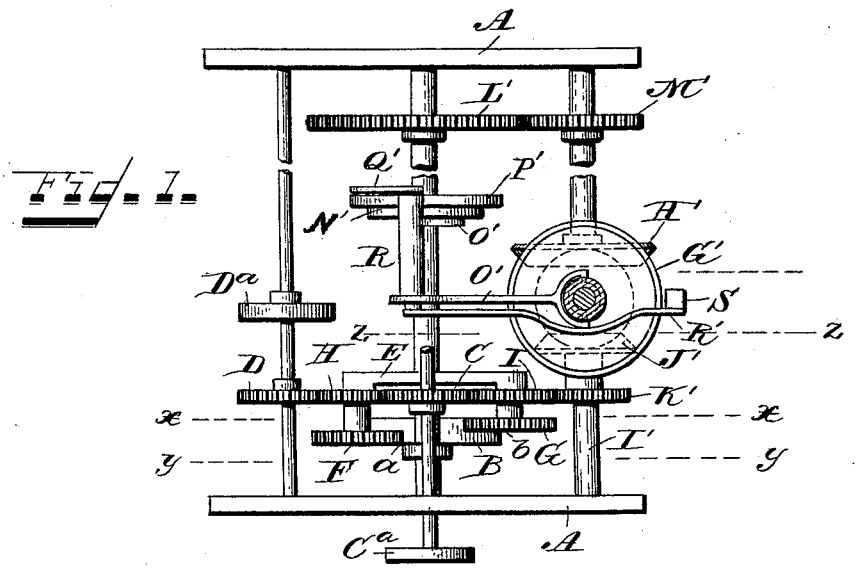
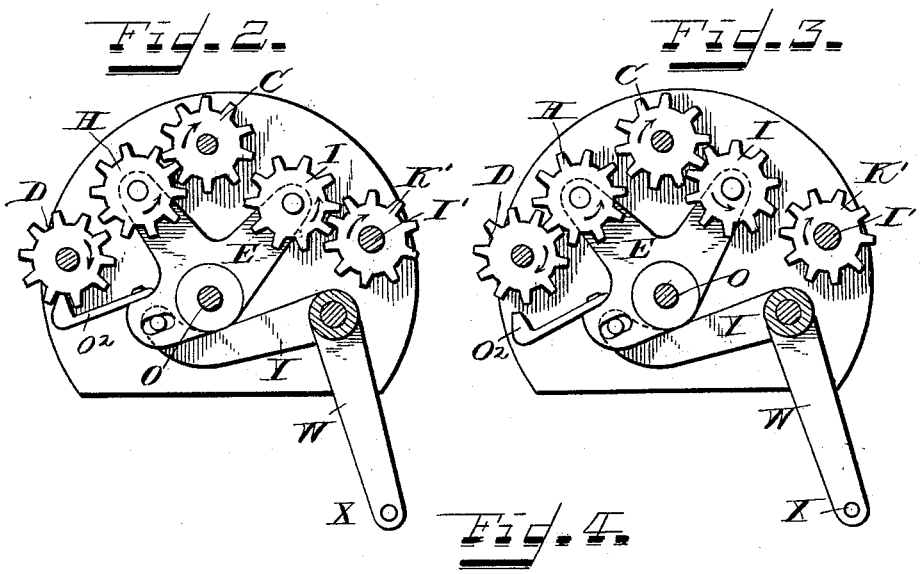
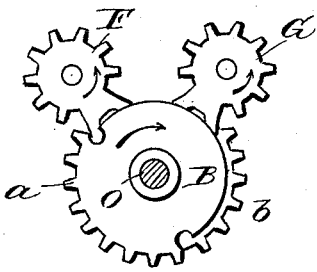
Witnesses.
Joseph A. Workman
G. P. Lasure
Inventor.
Hugo Cook (No Model.) 6 Sheets—Sheet 2.
H. COOK.
CASH REGISTER, INDICATOR, AND RECORDER.
No. 518,344. Patented Apr. 17, 1894.
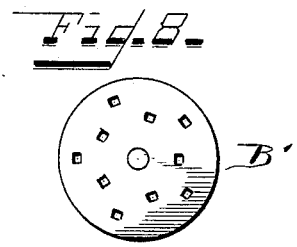
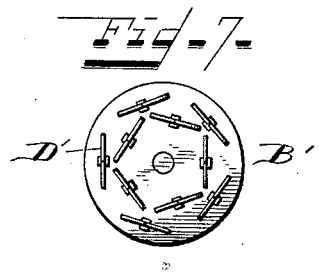
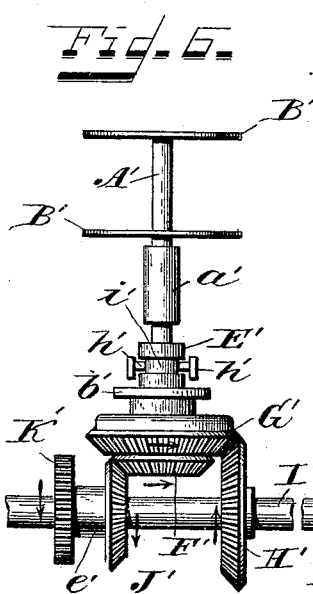
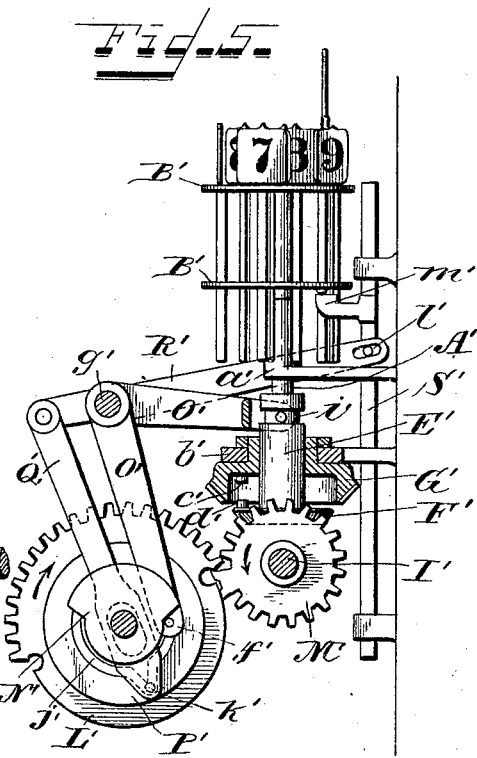
Witnesses
Joseph A. Wortman
J. P. Lasure
Inventor.
Hugo Cook

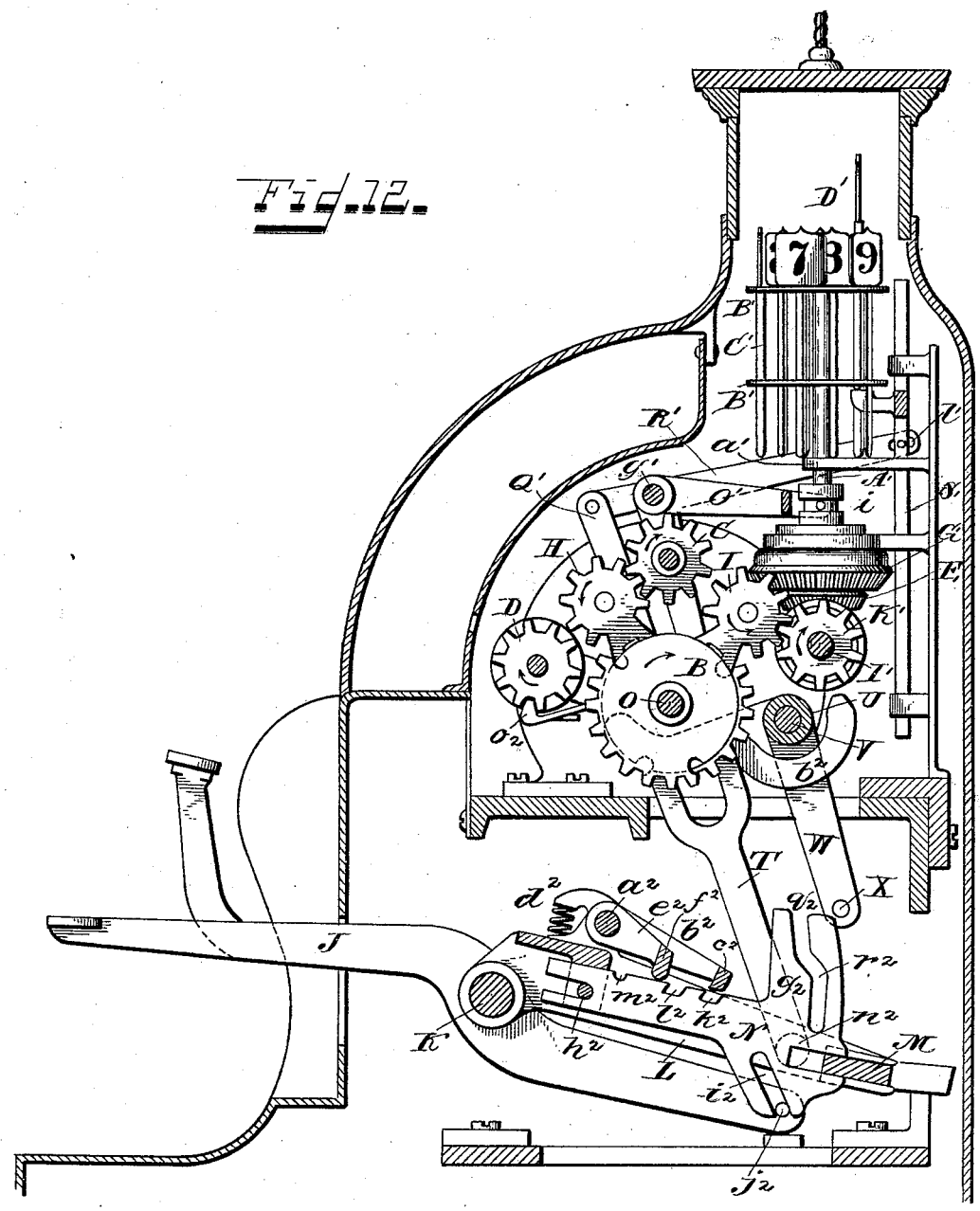

(No Model.) 6 Sheets—Sheet 4.
H. COOK.
CASH REGISTER, INDICATOR, AND RECORDER.
No. 518,344. Patented Apr. 17, 1894.

Witnesses.
Joseph A. Wortman
J. P. Lasure

Inventor.
Hugo Cook (No Model.)  6 Sheets—Sheet 5.
H. COOK.
CASH REGISTER, INDICATOR, AND RECORDER.
No. 518,344. Patented Apr. 17, 1894.
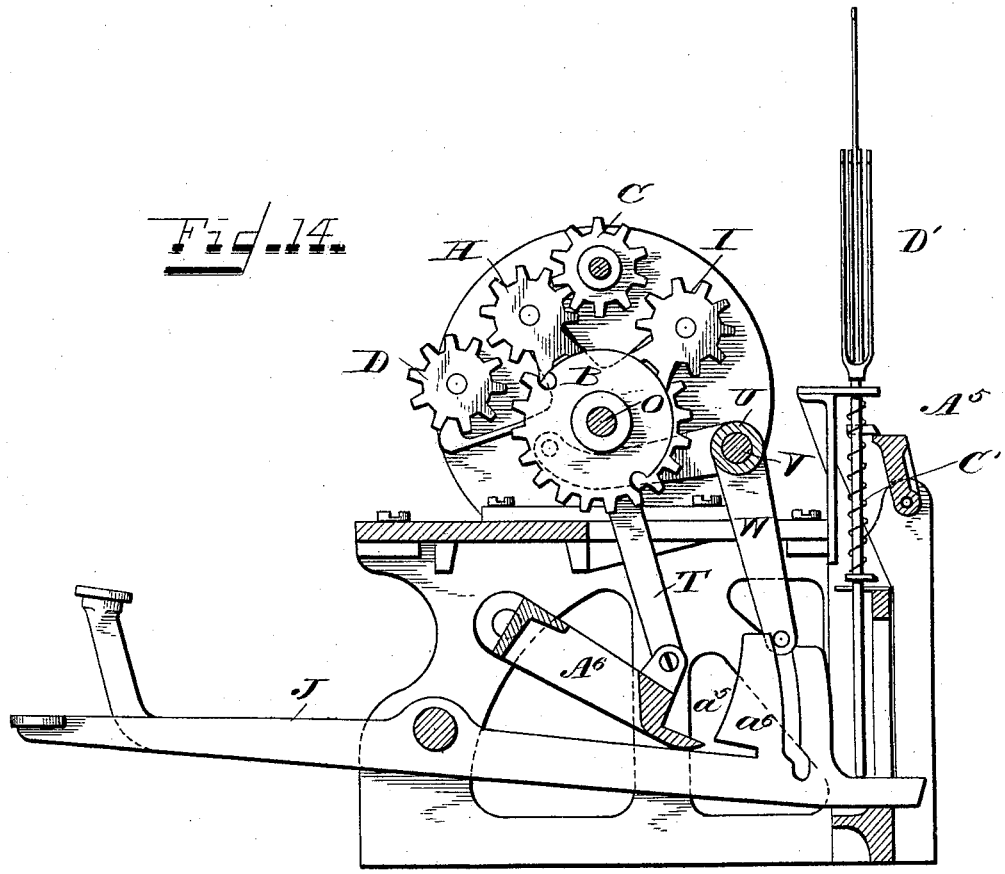
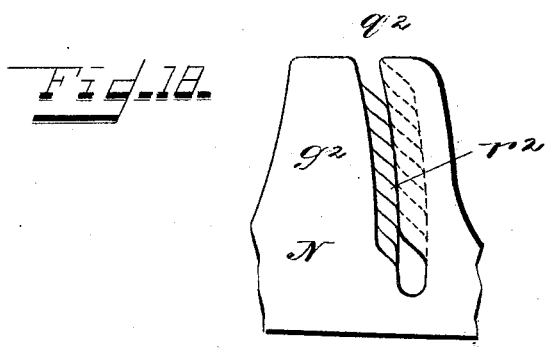
Witnesses
Joseph A. Wortman
J. P. Lasure
Inventor.
Hugo Cook

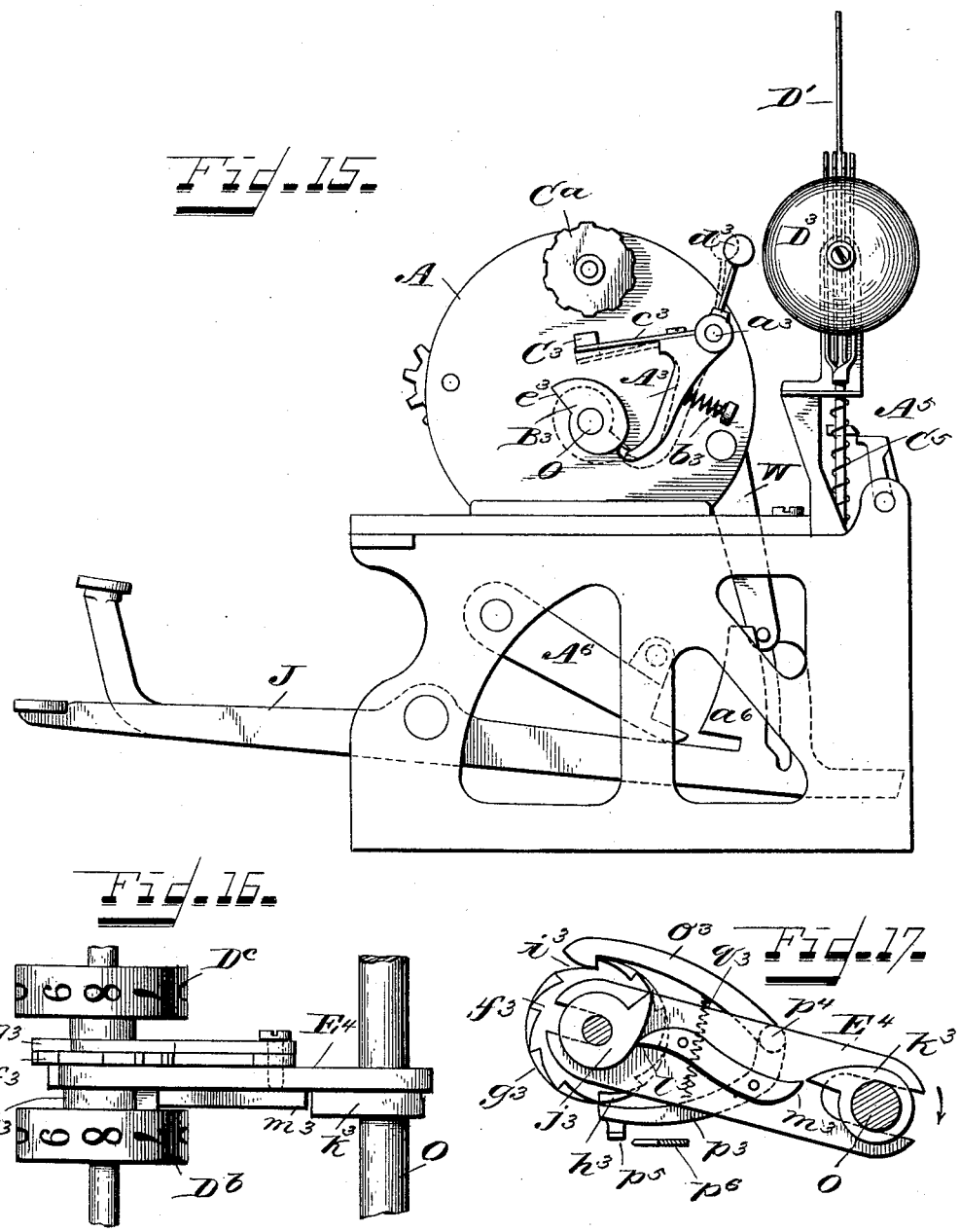

UNITED STATES PATENT OFFICE.

HUGO COOK, OF DAYTON, OHIO, ASSIGNOR TO ANNA M. COOK, OF SAME PLACE.

CASH REGISTER, INDICATOR, AND RECORDER.

SPECIFICATION forming part of Letters Patent No. 518,344, dated April 17, 1894.

Application filed February 27, 1893. Serial No. 463,930. (No model.)

*To all whom it may concern:*

Be it known that I, HUGO COOK, a citizen of the United States, residing at Dayton, in the county of Montgomery and State of Ohio, have invented certain new and useful Improvements in Cash Registers and Indicators, of which the following is a full, clear, and exact description, reference being had to the accompanying drawings, forming part of this specification.

My invention relates first, to a new mechanical movement for such machines; secondly, to the various combinations necessary to the embodiment of said movement in a complete machine; thirdly, in a novel indicating mechanism; and fourthly, in a novel transfer and other mechanisms, all as will be hereinafter set forth and more particularly pointed out in the claims.

In the accompanying drawings:—Figure 1, Sheet 1, is a plan view of mechanism embodying both forms of my movement but with the tablets and their supporting rack broken away. Fig. 2, Sheet 1, is a side elevation on the dotted line X X of Fig. 1, omitting the indicating mechanism and with the parts in one position. Fig. 3, Sheet 1, is a corresponding view with the parts in the other position. Fig. 4, Sheet 1, is a side elevation on the dotted line $y\ y$ of the driver and lock pinions in normal position. Fig. 5, Sheet 2, is a side elevation of the indicating mechanism on the broken dotted line $z\ z$ of Fig. 1. Fig. 6, Sheet 2, is a rear elevation of parts of the indicating mechanism and with the tablets and tablet rods removed. Fig. 7, Sheet 2, is a plan view of the indicator rack with tablets. Fig. 8, Sheet 2, is a corresponding view of the same without the tablets. Figs. 9 and 10, Sheet 2, are diagrams in plan to illustrate the action of the indicator pins. Fig. 11, Sheet 2, is a sectional detail elevation for the same purpose. Fig. 12, Sheet 3, is a sectional side elevation of a cash register embodying my invention. Fig. 13, Sheet 4, is a plan view of the same removed from the case. Fig. 14, Sheet 5, is a sectional side elevation of another form of cash register embodying parts of my invention. Fig. 15, Sheet 5, is an end elevation of the machine of Fig. 14. Fig. 16, Sheet 5, is an enlarged plan view of the transfer mechanism. Fig. 17, Sheet 5, is a side elevation of Fig. 16. Fig. 18, Sheet 5, is a broken detail showing the relative positions of the graded cams in the slides.

The same letters of reference are used to indicate identical parts in all the figures.

In my prior application, Serial No. 458,642, filed January 17, 1893, the mechanical movement consisted of three principal members, namely, a driving member with a uniform movement at each separate operation, an indicating member, and a registering member carried on a movable frame so as to be connected with and disconnected from the driving member at certain predetermined times, the arrangement being such that, during the first half of the operation of the driving member, the indicating member would be picked up and returned to initial position or zero and during the second half of the operation the indicator would be turned to the position desired and arrested and the registering member, then engaged by the driving member and be given a movement corresponding with the indication so made and then be disengaged from the driving member.

My present movement in its first form consists in a driving member having a complete revolution at each operation, a registering member, and a type wheel, with a movable frame and mechanism thereon actuated by the driving member, in such manner that during the first half of the movement of the driving member the type wheel is first set to the point desired and then arrested, and then the driving member is disconnected from the type wheel and connected with the registering member which is given its movement and arrested; while during the second half of the movement of the driving member the type wheel is again engaged and turned in the direction of its former movement to initial position. In its second form, in addition to the above, either with or without the type wheel, I employ an indicating member which during the first half of the movement of the driving member is actuated first to destroy a previous indication then to pick up and set the indicator to zero or initial position, while, during the second half of the movement of the driving member, the indicator is set to position and the particular tablet corresponding to the amount registered, is brought into view.

To illustrate and describe my first form of movement reference may be had to Figs. 1, 2, 3 and 4 where, in any suitable frame A, is journaled the driving member B consisting essentially of a wheel carrying two lock gears $a\ b$ side by side but having different times-action. C is a type pinion on a shaft or sleeve carrying a type wheel $C^a$, and D a registering pinion on a shaft or sleeve carrying a registering wheel $D^a$. The numbers on the type wheel run in a direction reverse to its direction of revolution. On a movable frame E, hung concentric with the gears $a\ b$, are journaled two lock pinions F, G, the former carrying a pinion H between and in line with the pinions C, D, and the latter on the opposite side of the pinion C carrying a pinion I in line with the pinion C, and so located that when H is in engagement with C, D is out of engagement, and when H is in engagement with D, I is in engagement with C as seen in Figs. 2 and 3. The gear $a$ is in line with and meshes with pinion F while the gear $b$ is in line with and meshes with pinion G. The normal position of the parts at rest is shown in Fig. 2, and the direction of the revolution of the driver is indicated by the arrow. The two gears $a\ b$ are so disposed on the driver B that while one is in action and turning its lock pinion the other is out of action and its pinion is held locked, so that, during the first half revolution of the driver, the one lock pinion is first started and actuates one of the driven members, say the type wheel, a certain number of degrees and then is shifted to actuate the other driven member the remaining number of degrees and then goes out of action and becomes locked to the driver, while during the second half revolution of the driver the other lock pinion is first started and actuates one of the driven members, say the type wheel, turning it in the direction it was before turned to initial position or zero and is then disconnected and turns idly, as to the type wheel, until it becomes again locked to the driver at the end of the second half of the revolution. Suppose now it is desired to register 8 and set the type wheel so that 8 will be printed. It will be observed that the driver is twice the diameter of the pinions F, G, and the latter have ten teeth each, the lock-blank constituting two as usual in this class of gearing, and the gears $a\ b$ have each nine teeth with two cuts for the lock-blank. At the beginning of the revolution of the driver the pinion F will start to turn thereby turning the pinion C and the type wheel. When the latter has been turned two notches so as to bring the 8 on the type wheel into printing position, in this instance on its under side, the frame E is shifted so as to throw the pinion H out of engagement with the pinion C and into engagement with the pinion D of the registering wheel, see Fig. 3. At the same time the pinion I is thrown into engagement with pinion C but is still locked by its blank on the lock pinion G to the driver. The type wheel is thus also locked through the medium of the pinion G. The moment the pinion H engages the pinion D the registering wheel begins to turn and turns eight divisions and then stops because the lock blank engages the driver at this moment and the latter has completed one half a revolution. Just at this moment the printing is effected, as hereinafter described, and the pinion I begins to turn under the action of its lock pinion G and turns the pinion C and type wheel in the same direction they were turned before to initial position, at which point the frame E is again shifted to first position and the pinion I is disengaged from the pinion C but still continues to turn until the end of the stroke. At the moment the pinion I is disengaged from pinion C pinion H is re-engaged therewith and locks the same, for the blank of its lock pinion is still engaged by the driver until the end of the operation. Thus it will be seen that for every complete revolution of the driver the type wheel is given one complete revolution in two movements, the first to set it to print the amount registered, and the second to turn it on to initial position again, one of these movements being imparted by one lock pinion during the first half movement of the driver and the other being imparted by the other lock pinion during the second half movement of the driver; the point of arrest of the type wheel between its two movements being determined by the point of disconnection of the first lock pinion, and the point of arrest at the initial position being determined by the point of disconnection of the second lock pinion. It will also be observed that when the type wheel is turned two degrees to expose 8 in printing position the lock pinion having eight more degrees of movement will, when shifted, turn the register wheel eight degrees. If the type wheel should be turned three degrees to expose 7 the lock pinion would have seven more degrees of movement which would be transferred to the register wheel, and so on. So also, in resetting the type wheel, the second lock pinion turns it a number of degrees of movement corresponding to the difference between its first movement to do the printing and the initial point or zero, and then becomes disconnected from it.

I will now describe my second form of movement which may be employed either in connection with the type wheel or without it, reference being had to Figs. 1, 2, 3, 4, 5, 6, 7, 8, 9, 10, 11 and 12. Suitably supported just below the reading opening in the case or cabinet, in this instance by a bracket sleeve $a'$, is a revoluble rack or holder composed in this instance of a central vertical shaft $A'$ to which are made fast two horizontal disks or spiders $B'$ with perforations through them to receive and guide the tablet rods $C'$ carrying at their upper ends the numbered tablets D'. In this instance for each group of keys there are ten tablet rods with tablets numbered from 0 to 9 in multiples of one and set in two concentric circles as seen in Figs. 7 and 8. Feathered on the lower end of the shaft A' is a sleeve E' to the lower end of which is fast a beveled pinion F'. The sleeve E' passes through and is free to turn in the hub of a second beveled pinion G' suitably journaled in a bracket $b'$. Upon the under side of the pinion G', which in this instance is formed with a recess, is a pin $c'$, and on the upper side of the pinion F' is a pin $d'$ which when the sleeve E' and pinion F' are lifted, as hereinafter explained, is brought into the path of travel of the pin $c'$. The pinion G' constantly meshes with a beveled pinion H' fast upon a shaft I' parallel with the axis of the driver B, and the pinion F', in its normal position, meshes with a beveled pinion J' fast on a sleeve $e'$ journaled on the shaft I'. Likewise fast on the sleeve $e'$ is a pinion K' in line with the pinion I and having the same number of teeth. Carried by and concentric with the driver B is a second lock gear L' engaging a lock pinion M' fast on the shaft I'. The teeth of the lock gear L' are so disposed that at the beginning of the stroke of the driver they start to revolve the pinion M' and give it and the shaft I' a complete revolution which terminates at the end of the first half stroke of the driver, and then during the second half stroke the pinion M' and shaft I' are locked to the gear L'. Also carried by and concentric with the driver is a cam N' Figs. 1 and 5, which engages a pin or projection $f'$ on the lower end of a bell crank arm O' pivoted as at $g'$ and whose rearward member is forked and provided with pins $h'$ Fig. 6 engaging a circumferential groove $i$, in the sleeve E' above the pinion G'. Likewise carried by and concentric with the driver is a disk P', Figs. 1 and 5, having a cam groove $j'$ on one side which engages a pin $k'$ on the lower end of an arm Q' slotted, as shown by the dotted lines, to straddle the shaft or hub of the cam and having its upper end pivoted to a lever R' which is likewise pivoted as at $g'$ and whose rear end engages, in this instance by means of a slot and pin as at $l'$, a vertically guided rod S' having a projection or shoulder $m'$ to engage one of the tablet rods, in this instance the rearmost one, and to hold it up exposed to view through the opening in the case when the parts are in normal position or at rest, as in Figs. 5 and 12. The shape of the cam groove $j'$ is circular and concentric with the driver except at one point where it extends outward in abrupt V shape, see Fig. 5, and in normal position the pin $k'$ of the arm Q' rests in the point of the V. The first action of the driver carrying the cams and pinion L' in starting, therefore, is to abruptly throw up the arm Q' and tilt the lever R' thereby lowering the rod S' and the exposed tablet and its rod. At the same time the cam N' acting on the arms O' O' raises the sleeve E' thereby lifting the pinion F' into contact with the pinion G' which is also turning under the impulse of the shaft I' through the medium of the gears L' M' and pinion H'. Now if the exposed tablet at the beginning of the operation was 0, the relative location of the pins $c'$ $d'$ would be that shown in Figs. 9 and 11, (Fig. 11 being a side elevation in the direction of the arrow in Fig. 9) and before the pinion F' reached the under side of the pinion G' the latter would have turned sufficiently to take its pin beyond the pin $d'$ and the pinion G' would then turn idly making one complete revolution during the first half stroke of the driver and bring its pin $c'$ back to the initial position, Fig. 9, without having come in contact with the pin $d'$. I prefer to bevel the ends of the pins as seen in Fig. 11 so that clearance can be effected under the above conditions in less than one tenth of the turn of the pinion G'. Suppose now on the contrary, that at the beginning of the operation the exposed tablet was an 8. The pin $d'$ would then occupy the position shown in Fig. 10 (the tablet numbers like those of the type wheel being arranged in a direction opposite to that of their rotation) and the pinion F' having been lifted as before described the pin $c'$ would turn on with its pinion until it came in contact with the pin $d'$ whereupon the pinion F' would be locked to the pinion G' and would be turned with it, thereby, through the medium of the sleeve E' and shaft A', turning all of the tablets back to zero or initial position just at the end of the first half stroke of the driver. Just at this moment the cam N' would release the arms O', O' and the pinion F' would be lowered back to re-engage the pinion J'. Now it has been before stated that, after resetting the type wheel to zero, the pinion I becomes disengaged from pinion C and turns idly as to said pinion for the rest of its revolution. But in shifting from pinion C pinion I at once becomes engaged with pinion K' and, following out the illustration of registering, printing, and indicating 8, the two degrees of movement left to pinion L would be transferred to pinion K' thereby turning pinion F' through the medium of pinion J', two degrees and with it the tablet rack and tablets so that the tablet bearing 8 would be directly over the arm $m'$ of rod S'. And now just at this point the pin $k'$ at the end of each complete revolution is forced down the V groove thereby raising rod S' and lifting the tablet 8 into view. As to my second form of movement, it will be seen from the foregoing that during the first half revolution of the driver the exposed tablet is taken from view, the tablets or indicators are reset to zero and the registry is effected, while during the second half of the revolution of the driver the indicator is set to proper position and the proper number corresponding with the registration brought into view. Where the type wheel is used its action is as before explained. Thus it will be seen that during the first half revolution of the driver the pins $c'$ $d'$ are brought into the same plane and the former serves to pick up the latter, if it be advanced one degree or any number of degrees beyond one, and return it and the tablets to normal position; but as above explained if pin $d'$ is not advanced one degree pin $c'$ will clear it and return to normal position without having acted on the tablets at all.

Having now described and explained both forms of my movement I will describe their embodiment in a cash register, reference being had to Figs. 12, 13, 14, 15, 16, 17 and 18. In Figs. 12 and 13, there are two banks of the usual keys J and $J^a$ hung on a horizontal shaft K supported by the frame work. Hung by side arms L on the same shaft K is the main vibrating frame composed of said side arms and a rear bar M connecting the side arms, see Fig. 12. Pivoted to the main vibrating frame as at $a^2$ is a second vibrating frame hung by side arms $b^2$ and connected at their rear ends by a transverse bar $c^2$. A spring or springs $d^2$ serve to hold the rear end of the second frame down against any suitable stop lug or projection not shown. For each bank of keys there is a third vibrating frame with side arms $e^2$ hung concentrically with the arms $b^2$ and with rear bars $f^2$. Alongside of and over each key there is a flat piece N with an upward projection $g^2$ at its rear end. The forward end of each of the pieces N is slotted and carried on a guide rod or guide pins $h^2$ secured to the main vibrating frame, while their rear ends are slotted and guided on the bar M as shown. Each of the pieces N has a pendent portion with an inclined or cam slot $i^2$ in which is confined a pin $j^2$ on the rear end of the adjacent key, while on the upper edge of each of said pieces are three notches $k^2$, $l^2$ and $m^2$ the last named being rounded as shown. The normal position of the parts at rest is shown in Fig. 12, and it will be seen that, whenever any key is operated, its first movement upward will, through the medium of the pin $j^2$, throw its piece N rearward until its notch $m^2$ is engaged by the bar $f^2$ which serves as a lock to hold the piece N pressed back. Just at this moment the end wall of the rear slot in the piece N comes in contact with the front edge of the bar M and, forming a lock therewith, the main vibrating frame begins to be raised by the further movement of the key. As soon as the main vibrating frame begins its upward movement all of the pieces N of the unoperated keys will also be lifted and their notches $k^2$ will be engaged by the bar $c^2$ thereby forming a lock for a purpose to be presently explained, while the piece N of the operated key will be further locked by the bar $c^2$ engaging its notch $l^2$ which has been projected into its path. As seen in Fig. 13 there are eighteen keys in two banks the first, J, numbered from 1 to 9 in multiples of one, and the second, $J^a$, from 10 to 90 in multiples of ten. There are two drivers B and their connected mechanism, such as before described, and said drivers are fast on a shaft O extending horizontally over all the keys and journaled in the frame work. The two shifting arms E are hung loosely on the shaft O. The lock gear L' and the cam N' P' are likewise fast on the shaft O. There are two sets of indicators as shown, one for the keys J, and the other for the keys $J^a$. There are two type wheels $C^a$ and $C^b$ the former fast on the shaft P carrying the pinion C for the keys $J^a$, and the latter fast on the sleeve Q loose on the shaft P and carrying the pinion C for the keys J. The two horizontal arms O' for the sleeve E', Fig. 5, are fast on the sleeve R loose on the shaft $g'$ to which the arms R' are fast, one of said arms projecting through a slot or cut out portion in the sleeve R. Suitable journal bearings, not shown, for the sleeve R and shaft $g'$ are provided. The register wheels of which there are four in this instance $D^a$, $D^b$, $D^c$ and $D^d$ are each fast on a separate sleeve journaled on a shaft S suitably supported by the frame. The sleeve of the wheel $D^a$ carries the pinion D actuated by the driver of the keys J and the sleeve of the wheel $D^b$ carries the pinion D actuated by the driver of the keys $J^a$. To actuate the shaft O one complete revolution at each complete operation of a key a variety of means may be employed though I have partially illustrated a double rack-bar T Figs. 12 and 13 with a forked upper end straddling a ratchet on the shaft O, such as shown in my prior application Serial No. 452,569, whose lower end is pivoted to the main vibrating frame on one side as shown by the dotted lines at $n^2$ Fig. 12, the construction being such that at the complete upward stroke of the vibrating frame the shaft O and the parts fast thereon will be given one half of a complete revolution and on the complete return stroke the remainder of the revolution will be given so that for every complete operation of a key the shaft O and the parts fast thereon will be given one complete revolution. Suitably journaled in rear of and parallel to the shaft O are two rock shafts in this instance in the form of sleeves U Figs. 12 and 13 carried on a shaft V extending across and supported by the frame. Each of these sleeves has two or more pendent arms W carrying at their lower ends a horizontal rod X one for each bank of keys and which when the parts are in normal position are just in rear of the upper rear edges of the pieces N, as seen in Fig. 12 and each sleeve U has a forward projection or arm Y, see Figs. 2 and 3, whose front end is pivoted to a projection on each of the shifting arms E. Each of the arms E has at its forward side a yielding dog $o^2$ for the pinions D and at its rear side a locking dog $b^2$ for the pinions K' the arrangement being such that when the dogs $o^2$ engage the pinions D the dogs $b^2$ are disengaged from the pinions K', and vice versa. In each of the upward projections $g^2$ of the sliding pieces N there is a slot $q^2$ Fig. 12 with a cam offset $r^2$, these cam offsets being stepped or graded for each bank of keys, that for the key of lowest number being nearest the bottom and that for the key of the highest number being nearest the top with the intermediate ones equally graded between the two as seen by the diagram Fig. 18 which represents the position of each offset of nine keys when they are at rest.

Having described the construction and organization of the machine thus far, I will now describe its operation as to the variable shifting of the arms E and the pinions carried thereby so as to effect the setting of the type wheels, the operation of the register wheels (except the transfer), and the operation of the indicators. We will assume that the indicators both show 0 at the reading openings and that the register and type wheels are at 0 at their reading and printing points. Now suppose the 5 key to be operated, that being the one shown in elevation in Fig. 12. The first movement of the key will throw its slide N back as before described, so that when it is arrested the top of the slot $q^2$ will be directly under the rod X, and then as the main vibrating frame and the slides are lifted the slide of the 5 key will, by its slot $q^2$, engage the bar X which enters the slot, but will not move it until the offset $r^2$ reaches the bar X just at the completion of the upper half stroke of the vibrating frame. During this time the type pinion C will have been turned five degrees as before described and its type wheel $C^b$ will be set to bring its 5 into printing position. Just at this moment the further upward movement of the slide N of the operated key will, by means of its offset $r^2$, throw the arm X and arms W back, thereby tilting the arm E and disengaging pinion H from pinion C and disengaging pinion I from pinion K' and engaging it with pinion C. During the rest of the upward movement of the vibrating frame the arm E remains stationary and the registering wheel is turned to register 5 as before explained. Also during the entire upward movement of the vibrating frame the shaft I' is given a complete revolution thereby turning the pinion H' a complete revolution, but not turning the shaft A' or the tablets for the reason before explained. Now during the first half of the down stroke of the vibrating frame the arm E still remains stationary, the pinion H stops turning, the pinion I starts and turns the pinion C and the type wheel on to 0, and then just at this point the offset $r^2$ again acting on rod X forces it and arms W forward again and reshifts arm E to original position, with pinion H engaging pinion C, and pinion I engaging pinion K'. The latter then begins to turn and through the medium of pinion J' turns shaft A' to bring the 5 tablet over the projection $m'$ of the tablet lifting rod, and just at the completion of the downward stroke the arm S' is lifted as before described to bring the tablet with 5 on it into view. After the main vibrating frame is reset, the key has a further movement and its pin $j^2$ acting on the wall of the slot $i^2$ draws back the slide N to original position, for it will be observed that before the complete resetting of the main vibrating frame the bar $c^2$ will have been arrested and will become unlocked from the notches $k^2 l^2$. Now let us suppose at the next operation it is desired to register, print and indicate 24. The 20 key and the 4 key will be pressed until their slides are in position to engage the bar X and are locked. Then pressure may be applied to either key alone, and the effect of the operation of both keys will be produced, the shifted slides performing the office of key couplers so that the pressing down of one key carries the other with it. Both the arms E will be shifted but at different times owing to the relative location of their offsets $r^2$, the tablets will be first picked up and reset to zero and then turned so that the one to the left will have its 2 over the lifting projection, and the one to the right its 4 over the lifting projection, the printing wheels will be appropriately turned and at the end of the operation the two tablets showing 2 and 4 will appear and 24 will have been registered, printed and indicated. As 5 has been already registered the two registering wheels will show, the one to the left a 2, and the one to the right a 9 or a total of 29.

In Fig. 15 I have shown one simple form of printing mechanism applicable to the style of machine there represented as well as to the one shown in Figs. 12 and 13. Here I provide an arm $A^3$ pivoted as at $a^3$ and whose lower end engages, under the tension of a spring $b^3$, a cam $B^3$ fast on the end of the shaft O. $C^3$ is a platen just under the type wheels and carried on a spring arm $c^3$ fast to the arm $A^3$. $D^3$ is a bell or gong on a fixed support and $d^3$ its hammer fast to the arm $A^3$. The cam has a single shoulder $e^3$ and it is so arranged on the shaft O that during the first half revolution of the shaft O the arm $A^3$ is pushed back putting the spring $b^3$ under further tension until just at the completion of a half revolution of the shaft O, when the type wheels have been set, the arm $A^3$ rides over the end of the shoulder and, being released, the spring $b^3$ throws up the platen $C^3$ to effect the printing of an interposed check or ribbon of paper and the hammer strikes the gong. An inking ribbon, not shown, is interposed between the check and the platen and it may be supported in any suitable manner.

I will now describe the transfer mechanism by which the tens of one register wheel are carried or transferred to the register wheel of the next higher denomination, reference being had to Figs. 13, 16 and 17. The register wheel $D^b$ has fast upon the end of its sleeve next to the wheel $D^a$ two disks $f^3$ $g^3$ side by side the former being a ratchet with ten teeth and the latter having but one cut $i^3$. Supported on the shaft O and the shaft S is a flat piece or bar $E^4$ at right angles to said shafts and slotted at both ends so as to rest on said shafts and be free to be moved endwise. Fast on the sleeve or hub of the wheel $D^a$ by side of the bar $E^4$ is a cam $j^3$ and fast on the shaft O by side of the bar $E^4$ is a similar cam $k^3$. On the side of the bar next to the cam $j^3$ is a lug or projection $l^3$ which the cam $j^3$ engages to move the bar $E^4$ backward while $m^3$ is a similar projection in the path of the cam $k^3$ by which the bar $E^4$ is moved forward again. I have shown both of these projections as one piece on the side of the bar $E^4$ though they may be separate if desired. On the opposite side of the bar is pivoted as at $n^3$ a dog or pawl $p^3$, and to a projection of said dog is pivoted as at $p^4$ a pawl $o^3$ which is on top and is a hook pawl engaging the disk $g^3$ with one cut, and the pawl $p^3$ is on the under side and is a push pawl engaging the ratchet $f^3$. Any suitable spring as $q^3$ serves to draw the pawls into constant contact with the disks $f^3$ $g^3$. The one cut of the disk $g^3$ is between the 9 and 0 of the register wheel to which it is fast. The cam $j^3$ is so disposed that it only acts to press the bar $E^4$ back as its register wheel $D^a$ passes from 9 to 0, and in this position the pawl $o^3$ is in engagement with the one cut of the disk $g^3$ and as the bar $E^4$ is pressed back the pawl $o^3$ turns the register wheel $D^b$ one degree or from 9 to 0. The cam $k^3$ is so adjusted on the shaft O that it only acts to press the bar $E^4$ forward during the second half stroke of the driver, or, which is the same thing, during the second half revolution of the shaft O. On the under side of the pawl $p^3$ there is a T shaped projection $p^5$, just in the rear of and slightly below which is a beveled-edge bar $p^6$ secured to the frame work and having a slot in line with the projection $p^5$. Now whenever the pawl $o^3$ is in engagement with the one cut of the disk $g^3$ and is drawing it from 9 to 0 the resistance of said disk is such that pawl $p^3$ is thrown down or away from the ratchet $f^3$ and in moving back with the bar $E^4$ the projection $p^5$ enters the slot of bar $p^6$ thereby locking pawl $p^3$ to said bar and preventing it from engaging ratchet $f^3$ on the forward stroke of bar $E^4$. At the end of the forward stroke of said bar, however, the projection $p^5$ rides out of the slot of bar $p^6$ and the pawl $p^3$ again engages the ratchet $f^3$. This locking of the pawl $p^3$ out of action occurs only when the pawl $o^3$ is in action drawing forward wheel $D^b$ from 9 to 0. At all other times when pawl $o^3$ is on the blank portion of disk $g^3$ the cam $j^3$, in forcing back bar $E^4$, carries the pawl $p^3$ back over the next tooth of ratchet $f^3$ and then on the return stroke of the bar $E^4$ by the cam $k^3$ the pawl $p^3$ turns the ratchet $f^3$ and with it wheel $D^b$ one degree as will be readily understood. As seen in Fig. 13, similar ratchets $f^3$ $g^3$, cams $j^3$ $k^3$, and bars $E^4$ with pawls $o^3$ $p^3$ are employed for all the register wheels beyond the first two described and each of the pawls $p^3$ has a T headed projection $p^5$ to engage with its slot in the bar $p^6$. But suppose wheels $D^b$ and $D^a$ both stood at 9 and the wheels above at 0 and key 1 is now operated. Wheel $D^a$ would be turned to 0 by the main driver and as wheel $D^b$ is at 9 its pawl $o^3$ is in engagement with the notch of disk $g^3$ and draws wheel $D^b$ to 0 as before described, but as wheel $D^b$ was at 9 its cam $j^3$ is in position to push back bar $E^4$ of wheel $D^c$ which it does during the movement of wheel $D^b$ from 9 to 0. The pawl $o^3$ however of wheel $D^c$ is not in engagement with the notch of disk $g^3$ and therefore pawl $p^3$ of wheel $D^c$ does not become locked to bar $p^6$ but goes back one tooth of its ratchet $f^3$ and on the return stroke under impulse of cam $k^3$ it turns wheel $D^c$ forward from 0 to 1 and the reading on the three wheels is 100. Let us suppose now that both wheels $D^a$ and $D^b$ stood at 9 and the wheels above stood at 0 and the 10 key and the 1 key are operated. In this case both the wheels $D^a$ and $D^b$ would be turned from 9 to 0 by the driving mechanism, and, as pawl $o^3$ of wheel $D^b$ moves back idly with the notch in which it is (the notch being moved by the operation of the driver), the pawl $p^3$ of said wheel is not thrown out to engage bar $p^6$ but goes back and engages the next tooth of ratchet $f^3$ and then, on the return stroke of bar $E^4$, pawl $p^3$ turns wheel $D^b$ from 0 to 1. At the same time and as before described wheel $D^c$ is turned from 0 to 1 and the reading will be 110 on the three wheels. Thus it will be seen that when wheels above the first are at nine and a transfer is to be made of the tens of the lower wheel such transfer is made only by the pawl or pawls $o^3$, and at other times by pawl or pawls $p^3$, but when two wheels are moved past 9 positively by the driving mechanism then the transfer of the ten of the lower wheel is made on the next higher wheel by the pawl $p^3$ during the second half revolution of the driver and after the wheels had ceased turning under the influence of the driver. It will also be seen that pawls $o^3$ and $p^3$ cannot act successively on the same wheels for when pawl $o^3$ acts, pawl $p^3$ is thrown out and locked, and when pawl $p^3$ acts, pawl $o^3$ is somewhere on the blank of disk $g^3$, and not in the notch at the beginning of the action, though it may be brought into the notch at the end of the action as where a wheel is turned from 8, or any lower point, to 9.

In Figs. 14 and 15, I have shown the application of my first form of movement to a well known form of cash register having its tablets in line at the rear of the case, and the rods of which are engaged directly by the rear ends of the keys.

$A^5$ is the usual or any suitable supporting wing or bar for the elevated tablets.

Instead of having the shifting slides N, each key has an upward projection provided with its appropriate slot $q^2$, and the vibrating frame $A^6$ of well known construction has the usual projecting flange $a^5$ which is engaged by a slot $a^6$ in the projection of the key which forms the well known key coupler and key lock. In machines of this last mentioned type both the printing wheels and the transfer mechanism heretofore described may be used.

Now returning to my preferred form of machine illustrated in Figs. 12 and 13, in which I have shown pivoted keys for operating the vibrating frame and the parts actuated thereby, I would say that it is evident that the pivoted keys and rack bar T might be dispensed with and push buttons be employed for operating the slides N to bring the proper slides into operative position, and a projecting crank handle might be applied to the shaft O to turn it in which case the bar T would be supplanted by a pitman connecting a crank on the shaft O with the main vibrating frame so that it would be raised and lowered at each revolution of the shaft O. Or again, retaining the rack bar T, any projecting handle might be applied to the main vibrating frame to be operated to raise and lower said frame after the appropriate slides N had been set.

Again, while I have shown means for raising and lowering the tablet or tablets corresponding to the amount registered yet such means might be dispensed with, where the reading opening is on one side only of the case, and the indicator in such case might be a horizontal wheel or drum carried in the space behind the reading opening on the shaft A′, and with the figures on its periphery, and be used with or without a screen to cover and uncover the reading opening. In case such a screen was used it could be carried on and operated by the rod S′ except that the raising of said rod would uncover the reading opening and its lowering would cover the reading opening.

Having thus fully described my invention, I claim—

1. In a cash register, the combination of rotary registering, printing and indicating members, each on a different fixed axis, a driver therefor, and means for connecting and disconnecting the driver and said members.

2. In a cash register, the combination of rotary registering and printing members on different fixed axes, a driver therefor, and means for dividing its action between said members in proportions to produce the required movement thereof, substantially as described.

3. In a cash register, the combination of rotary registering and indicating members on different fixed axes, a driver therefor and means for dividing its action between said members in proportions to produce the required movement thereof, substantially as described.

4. In a cash register, the combination of rotary registering printing and indicating members on different fixed axes, a driver therefor, and means for dividing its action between said members in proportions to produce the required movement thereof, substantially as described.

5. In a cash register, the combination of rotary registering and printing members on different fixed axes, a driver therefor having a definite movement at each operation, and means for dividing its action between said members in proportions to produce the required movement thereof during the first half of its movement, substantially as described.

6. In a cash register, the combination of printing and indicating members, a driver therefor, means for dividing the action of said driver between the members in proportions to produce the required movement thereof, and a separate driver for returning the indicating member to initial position, substantially as described.

7. In a cash register, the combination of registering and printing members, a driver therefor, a platen for the printing member, and means for dividing the movement of the driver between said members in proportions to produce the required movement thereof, substantially as described.

8. In a cash register, the combination of registering and printing members, a platen for the latter, a driver actuating said members and platen, and means for dividing the movement of the driver between said members in proportions to produce the required movement thereof, substantially as described.

9. In a cash register, the combination of rotary registering printing and indicating members, each revoluble in one direction only, a driver therefor, and means for dividing the movement of the driver between said members in proportions to produce the required movement thereof, substantially as described.

10. In a cash register, the combination of rotary, registering, printing and indicating members, each revoluble in one direction only, a driver therefor, and means for automatically connecting and disconnecting the driver and said members.

11. In a cash register, the combination with the registering, printing and indicating members, or any two of them, of a main driver, and secondary driving mechanism actuated thereby and carried on a movable frame, whereby said secondary driving mechanism can be shifted to divide its action between said members in proportions to produce the required movement thereof, substantially as described.

12. In a cash register, the combination with the registering, printing and indicating members, or any two of them, of a main driver, secondary driving mechanism actuated thereby and carried on a movable frame and actuated by the main driver, a series of keys, and shifting mechanism for the movable frame controlled by the keys, whereby said secondary mechanism is shifted at different times for each key to divide its action between said members in proportions to produce the required movement thereof, substantially as described.

13. In a cash register, the combination with the registering, printing and indicating members, or any two of them, of a main driver having a complete revolution at each operation, secondary driving mechanism actuated by the main driver and carried on a movable frame, a series of keys, and shifting mechanism for the movable frame controlled by the keys, whereby said secondary mechanism is shifted at differerent times for each key to divide its action between said members in proportions to produce the required movement thereof, substantially as described.

14. The combination of a registering member, a type member, a main driver, and secondary drivers actuated thereby and carried on a movable frame, the one of said secondary drivers for actuating both members, and the other for actuating the second member, substantially as described.

15. The combination of a registering member, a type member, a main driver, and secondary drivers actuated thereby and carried on a movable frame, the one of said secondary drivers for actuating both members and the other for actuating the second member, and means for shifting the movable frame, substantially as described.

16. The combination of a registering member, a type member, a main driver having a complete revolution at each operation, and secondary drivers actuated thereby at different times and carried on a movable frame, the one of said secondary drivers for actuating both members and the other for actuating the second member, and means for shifting the movable frame, substantially as described.

17. The combination of a registering member, a type member, a main driver having a complete revolution at each operation, and secondary drivers actuated thereby at different times and carried on a movable frame, the one of said secondary drivers for actuating both members and the other for actuating the second member, substantially as described.

18. The combination with a registering member, a type member, and an indicating member, of a main driver, and secondary drivers actuated thereby and carried on a movable frame, the one of said secondary drivers for actuating the first two members and the other for actuating the second member, substantially as described.

19. The combination with a registering member, a type member, and an indicator, of a main driver, and secondary drivers actuated thereby and carried on a movable frame, the one of said secondary drivers for actuating the first two members and the other for actuating the second two members, and means for shifting the movable frame, substantially as described.

20. The combination with a registering member, a type member, and an indicator, of a main driver having a complete revolution at each operation, and secondary drivers actuated thereby at different times and carried on a movable frame, the one of said secondary drivers for actuating the first two members and the other for actuating the second two members, substantially as described.

21. The combination with a registering member, a type member, and an indicator, of a main driver having a complete revolution at each operation, secondary drivers actuated thereby at different times and carried on a movable frame, the one of said secondary drivers for actuating the first two members and the other for actuating the second two members, and means for shifting the movable frame, substantially as described.

22. The combination of a driving member having a definite movement at each operation, a registering and printing member driven thereby, and suitable intermediate connecting and disconnecting devices, whereby the driving member during the first half of its movement sets the printing member and registering members to proper position, and whereby the second half movement of the driving member moves the printing member to initial position, substantially as described.

23. The combination of a driving member having a definite movement at each operation, a registering, indicating and printing member driven thereby, and suitable connecting and disconnecting devices, whereby the driving member during the first half of its movement is caused to pick up the indicating member and carry it to initial position and during the same time to set the printing member and actuate the registering member, and whereby the second half movement of the driving member is divided between the printing member, which is set to initial position, and the indicating member, which is actuated to indicate the amount registered, substantially as described.

24. The combination of a rotary driving member making a complete revolution at each operation, rotary registering and printing members driven thereby, means for automatically connecting the driving member with the printing member, disconnecting it therefrom and connecting with the registering member during the first half of the revolution, and connecting it again with the printing member to reset it to initial position during the second half of the revolution, substantially as described.

25. The combination of a rotary driving member making a complete revolution at each operation, rotary registering, printing and indicating members driven thereby, means for automatically connecting the driving member with the indicating member to reset it to zero, with the printing member to set it to proper position, and with the registering member to make the proper registration during the first half of the revolution, and then disconnecting it from the registering member and connecting it with the printing member to return it to initial position, and with the indicator to effect the proper indication, substantially as described.

26. The combination with a registering gear, a rotary driver having two lock gears and connecting devices, of two lock pinions engaged by the two lock gears of the driver and carried on a movable frame, and means for automatically shifting said frame, whereby the one lock pinion is caused to actuate the printing gear and then the registering gear during the first half revolution of the driver, and whereby the other lock pinion is caused to turn the printing gear to initial position during the second half revolution of the driver, substantially as described.

27. The combination with a registering gear, a printing gear, indicating mechanism, a rotary driver having lock gears and connecting devices, of two lock pinions engaged by the lock gears of the driver and carried on a movable frame, and means for automatically shifting said frame, whereby during the first half revolution of the driver the indicating mechanism is set to initial position, and the printing and registering gears are properly set, and whereby during the second half revolution of the driver the printing gear is set to initial position and the indicating mechanism is moved to effect the proper indication, substantially as described.

28. The combination of a rotary driving member, a rotary printing wheel having the numbers thereon arranged in backward order relatively to the direction of movement of said wheel, a registering wheel having the numbers arranged thereon in forward order relatively to the direction of movement of said wheel, and suitable connecting and disconnecting devices, whereby the driving member during the first half of its revolution turns the printing wheel to a given number and then turns the registering wheel to effect the registration of a corresponding number, and whereby during the second half of its revolution the driving member turns the printing wheel to initial position and then becomes disconnected therefrom, substantially as described.

29. The combination of a rotary driving member, a rotary indicator having its numbers arranged in backward order relatively to the direction of movement of said indicator, a rotary printing wheel having the numbers arranged thereon in forward order relatively to the direction of movement of said wheel and suitable connecting and disconnecting devices, whereby the driving member during the first half of its revolution turns the indicator to initial position, turns the printing wheel to a given number, and then turns the registering wheel to effect the registration of a corresponding number, and whereby during the second half of its revolution the driving member turns the printing wheel, substantially as described.

30. The combination with a registering wheel, a printing wheel, a rotary driver therefor, and suitable connecting and disconnecting devices on a movable frame, of a series of keys whose action causes the shifting of the movable frame at different times for each key during the operation of the driver, substantially as described.

31. The combination with a registering wheel, a printing wheel, indicating mechanism, a rotary driver therefor, and suitable connecting and disconnecting devices on a movable frame, of a series of keys whose action causes the shifting of the movable frame at different times for each key during the operation of the driver, substantially as described.

32. The combination with a registering member, an indicating member, a main driver and secondary drivers actuated thereby and carried on a movable frame, the one of said secondary drivers for actuating the first member and the other secondary driver for actuating the second member, substantially as described.

33. The combination with a registering wheel, a printing wheel, a rotatable indicator on a vertical axis, a rotary driver for the foregoing mechanism for setting the indicator to initial position during the first half revolution of the driver, and suitable connecting and disconnecting devices on a movable frame, of a series of keys whose action causes the shifting of the movable frame at different times for each key during the operation of the driver, substantially as described.

34. The combination of a registering member, an indicating member, a main driver and secondary drivers actuated thereby and carried on a movable frame, the one of said secondary drivers for actuating the first member and the other secondary driver for actuating the second member, and means for shifting the movable frame, substantially as described.

35. The combination of a registering member, an indicating member, a main driver having a complete revolution at each operation, and secondary drivers actuated thereby at different times and carried on a movable frame, the one of said secondary drivers for actuating the one member, and the other for actuating the other member, substantially as described.

36. The combination of a registering member, an indicating member, a main driver having a complete revolution at each operation, and secondary drivers actuated thereby at different times and carried on a movable frame, the one of said secondary drivers for actuating the one member and the other for actuating the other member, and means for shifting the movable frame, substantially as described.

37. The combination of a registering member, an indicating member, a main driver having a complete revolution at each operation, secondary drivers actuated thereby at different times and carried on a movable frame, the one of said secondary drivers for actuating the one member and the other for actuating the other member, means for shifting the movable frame, and a series of keys whose action causes the shifting of the movable frame at different times for each key during the operation of the main driver, substantially as described.

38. In a cash register, the combination of a main driver, a secondary driver, a revoluble indicator on a vertical axis, means for locking the indicator to the main driver to set it to initial position during the first half stroke of the driver, and means for locking the indicator to the secondary driver to set it to indicate the proper amount during the second half stroke of the driver, substantially as described.

39. In a cash register, the combination of a main driver, a secondary driver, a revoluble indicator on a vertical axis, means for locking the indicator to the main driver to set it to initial position during the first half stroke of the driver, and means for locking the indicator to the secondary driver, to set it to indicate the proper amount during the second half stroke of the driver, and a series of keys whose action causes the proper setting of the indicator on the second half stroke of the driver, substantially as described.

40. In a cash register, the combination of a main driver, a revoluble indicator on a vertical shaft, a sleeve feathered and free to slide on said shaft and carrying an actuating disk, a second actuating disk on said sleeve and given a complete revolution during the second half stroke of the driver, pins on the adjacent faces of the two disks and occupying the same plane of travel, means for bringing said pins into engaging position during the first half stroke of the driver to turn the indicator to initial position and then disengaging the same, and means for actuating the first disk during the second half stroke of the driver to set the indicator to the proper amount, substantially as described.

41. In a cash register, a series of circularly arranged constantly vertical tablets carried by a revoluble rack, means for revolving said rack and tablets, and means for exposing one of said tablets, substantially as described.

42. In a cash register, a series of circularly arranged tablets on vertically sliding rods, a revoluble rack in which said rods are mounted, means for revolving said rack, and means for exposing one of said tablets, substantially as described.

43. In a cash register, two or more series of circularly arranged and constantly vertical tablets, each series being carried by a revoluble rack, means for revolving said racks, and means for exposing one tablet of any series, substantially as described.

44. In an indicator mechanism, the combination of a series of constantly vertical tablets on vertical rods circularly arranged, an exposing member therefor, and means for operating the latter.

45. In an indicator mechanism, the combination of an exposing member, a series of constantly vertical indicators mounted to be moved, in a circle with a vertical axis, over said exposing member, and means for operating the latter, substantially as described.

46. In an indicator mechanism, the combination of an exposing member, a series of constantly vertical indicators mounted to be moved, in a circle with a vertical axis, over said exposing member, and means for operating said exposing member when the indicators have been moved a predetermined distance, substantially as described.

47. In an indicating mechanism, the combination of an indicating window, an exposing member, a series of constantly vertical indicators mounted to be moved, in a circle with a vertical axis, over said exposing member, and means for operating said exposing member to place an indicator in said window, substantially as described.

48. In an indicating mechanism, the combination of an indicating window, an exposing member, a series of constantly vertical indicators mounted to be moved, in a circle with a vertical axis, over said exposing member, means for automatically moving said indicators, and means for operating said exposing member to place the indicator in said window, substantially as described.

49. In an indicating mechanism, the combination of an indicating window, an exposing member, a series of constantly vertical indicators mounted to be moved, in a circle with a vertical axis, over said exposing member, a driver for first setting said indicators to initial position, a driver for then setting them to the position desired, and means for operating the exposing member to place the proper indicator in said window, substantially as described.

50. In an indicating mechanism, the combination of an indicating window, two or more series of indicators mounted to be moved, in a circle with a vertical axis, over an exposing member for each series, said exposing members, means for automatically moving said indicators, and means for operating said exposing members to place the proper indicator of each series in the window, substantially as described.

51. In a cash register, a series of circularly arranged tablets on sliding rods carried by a revoluble rack set vertically, means for revolving said rack and tablets to initial position and then to proper indicating position, and means for raising the properly set tablet and its rod, substantially as described.

52. In a cash register, the combination of a main driver, a movable frame with secondary driving mechanism actuated by the main driver, a series of keys, and means for actuating said movable frame controlled in its action by each of said keys, whereby the actuation of any key determines the particular time at which the movable frame is actuated, substantially as described.

53. In a cash register, the combination of a vibrating frame, a series of slides carried thereby, a series of keys for said slides, a lock to yieldingly lock any of said slides upon the initial operation of the key or keys, and a second lock to rigidly lock the operated slides in one position and the unoperated slides in another position upon further operation of the key or keys, substantially as described.

54. In a cash register, the combination of a vibrating frame, a series of slides carried thereby and provided with graded cams, a series of keys adapted to engage said slides and means for locking and unlocking the slides, substantially as described.

55. In a cash register, the combination of a main driver making a complete revolution at each operation, a movable frame with secondary revoluble driving mechanism actuated by the main driver, a series of keys, and means for actuating said movable frame controlled in its action by each of said keys, whereby the actuation of any key determines the particular time at which the movable frame is actuated, substantially as described.

56. In a cash register, the combination of a main driver, a movable frame with secondary driving mechanism actuated by the main driver, a series of keys, a tilting bar for said movable frame, a vibrating frame actuated at each stroke of the main driver, and a series of slides on said vibrating frame one for each key and provided with graded cams, whereby the actuation of any key sets its slide to actuate the tilting bar of the movable frame by means of its cam, substantially as described.

57. In a cash register, the combination of a main driver, a movable frame with secondary driving mechanism actuated by the main driver, a series of keys, a tilting bar for said movable frame, a vibrating frame actuated by each stroke of the main driver, a series of slides on said vibrating frame one for each key and provided with graded cams, and locks for each slide brought into action by the shifting of one or more of said slides under the action of its key or keys, substantially as described.

58. In a cash register, the combination of a series of transfer bars, a series of registering wheels adapted to move them in one direction, means for simultaneously effecting all transfers to the secondary wheels standing at 9 or the transfer point, and means for simultaneously moving said bars back to effect all transfers to secondary wheels standing elsewhere than at 9 or the transfer point.

59. In a cash register, two registering wheels on a common axis, a transfer bar actuated by one of said wheels in one direction and carrying two pawls for engaging the other registering wheels, means for operating the transfer bar in the opposite direction, and means for preventing the actuation of both pawls during one complete operation of the transfer bar, substantially as described.

60. In a cash register, a registering wheel, a cam carried therewith, a transfer bar actuated in one direction by said cam, a second registering wheel and two ratchets carried thereby, the one having a continuing series of teeth and the other one tooth, a pawl pivoted to the transfer bar for engaging the ratchet with the continuing series of teeth, a second pawl pivoted to the first pawl and engaging the ratchet with one tooth, a disengaging lock for the first pawl brought into action by the operation of the second pawl, and a second cam for actuating the transfer bar in the opposite direction, substantially as described.

61. In a cash register, a registering wheel, a cam carried therewith and arranged to operate between the 9 and 0 of the registering wheel, a transfer bar operated in one direction by said cam, a second registering wheel and two ratchets carried thereby the one having a continuing series of teeth and the other one tooth between the 9 and 0 of its wheel, a pawl pivoted to the transfer bar and engaging the ratchet with the continued series of teeth, a second pawl pivoted to the first pawl and engaging the ratchet with one tooth, a disengaging lock for the first pawl brought into action by the operation of the second pawl, and a second cam for actuating the transfer bar in the opposite direction, substantially as described.

62. In a cash register, a series of registering wheels on a common axis, a transfer bar for each of said wheels except the one of lowest denomination, a cam carried by each wheel for actuating its adjacent transfer bar in one direction, two pawls carried by each transfer bar and engaging notches on the next higher wheel, the one ratchet having a continued series of teeth and the other one tooth, a disengaging lock for each of the pawls engaging the ratchets with continued series of teeth and brought into action by the operation of its adjacent pawl, and a second series of cams for operating the transfer bars in the opposite direction, substantially as described.

63. In a cash register, the combination of a revoluble main driver B having the lock ears $a\,b$, the lock pinions F, G, on a movable frame E engaged thereby and actuated at different times, the pinions H, I, actuated by the lock pinions and movable therewith, the registering pinion D, the type pinion C, and means for shifting the movable frame E, substantially as described.

64. In a cash register, the combination of the revoluble main driver B having the lock gear $a\,b$, the lock pinions F, G, on a movable frame E, engaged thereby and actuated at different times, the pinions H, I, actuated by the lock pinions and movable therewith, the type pinion C and indicator pinion K', and means for shifting the movable frame E, substantially as described.

65. In a cash register, the combination of the main driving shaft O, the shaft I', the indicator revoluble on a vertical shaft A', the lock gear L' fast on the shaft O, the lock pinion M', fast on the shaft I' and engaging the gear L', the cam N' fast on the shaft O, the bell crank O' O' engaged by said cam, the gear G' in constant mesh with a gear on the shaft I', the sleeve $e'$ loose on shaft I' and driven at certain times from the shaft O, pinion J' fast on said sleeve $e'$, sleeve E' feathered and free to slide on shaft A' and passing loosely through hub of gear G' and engaged by bell crank O' O', the gear F' fast on the sleeve E', and arranged to mesh with gear J' while the latter is in action, the pin $c'$ on gear G', the pin $d'$ on gear F', substantially as described.

66. In a cash register, the combination of the vertically set revoluble rack carrying the circularly arranged tablets and their sliding rods, means for picking up and resetting the rack and tablets to initial position during the first half of an operation, the lifting rod S' for the properly set tablet, the main shaft O, the cam P' fast thereon, the arm Q' actuated by said cam, and the pivoted arm R' connected to the rod S' and to the arm Q', whereby the properly set tablet is lifted into view, substantially as described.

67. In a cash register, the combination of the movable frame E carrying secondary driving mechanism actuated by a main driver, a series of keys and projections provided with graded cams actuated thereby, and a shifter for the frame E, actuated by the graded cams, substantially as described.

68. In a cash register, the combination of the movable frame, E, carrying secondary driving mechanism actuated by a main driver, a series of keys and projections provided with graded cams actuated thereby, the bell crank arms Y, W, connected to the movable frame, and the bar X carried by the arms W and engaged by the graded cams, substantially as described.

69. In a cash register, the combination with the shifter for the secondary driving mechanism, a series of keys, the vibrating bar M, the slides N, carried by said bar and supported at their forward ends, the graded cam slots $q^2$ in said slides, notches $k^2$, $l^2$, $m^2$ in said slides, the lock bars $c^2$, $f^2$ on vibrating frames for said notches, and means for shifting said slides into operating position by the movement of the keys, substantially as described.

70. In a cash register, the combination with the shifter for the secondary driving mechanism, a series of pivoted keys, the vibrating bar M, the slides N carried by said bar and supported at their forward ends, the graded cam slots $q^2$ in their slides, the inclined slots $i^2$ in the slides, and pins $j^2$ on the keys engaging said slots, whereby at the initial operation of a key its slide is projected into operative position, and whereby at the end of the operation of a key its slide is brought back out of operative position, substantially as described.

71. In a transfer mechanism of a cash register, the combination with the shaft O having cam $k^3$, the registering wheel of lower denomination carrying cam $j^3$, the sliding transfer bar between and operated by said cams at different times, the registering wheel of next higher denomination carrying two disks $f^3$, $g^3$ the former having a continuing series of teeth and the latter one tooth, the pawl $p^3$ pivoted to the bar $E^4$ and engaging the ratchet $f^3$, the pawl $o^3$ pivoted to pawl $p^3$ and engaging the disk $g^3$, the locking lug $p^5$ on the pawl $p^3$, and the locking bar $p^6$ for engaging said pawl when pawl $o^3$ is in action, substantially as described.

72. In a cash register, the combination of the revoluble shaft O, the cam $B^3$ fast on said shaft the pivoted arm $A^3$ engaging said cam under spring pressure, the platen $C^3$ and gong hammer $d^3$ carried by said arm, the gong $D^3$ and type wheels, substantially as described.

HUGO COOK.

Witnesses:
JOSEPH A. WORTMAN,
J. P. LASURE.